US010841829B2

(12) United States Patent
Maeder et al.

(10) Patent No.: US 10,841,829 B2
(45) Date of Patent: Nov. 17, 2020

(54) RADIO BEARER SWITCHING IN RADIO ACCESS

(71) Applicant: NOKIA TECHNOLOGIES OY, Espoo (FI)

(72) Inventors: Andreas Maeder, Wurzburg (DE); Guillaume Decarreau, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 17 days.

(21) Appl. No.: 16/338,124

(22) PCT Filed: Sep. 4, 2017

(86) PCT No.: PCT/FI2017/050619
§ 371 (c)(1),
(2) Date: Mar. 29, 2019

(87) PCT Pub. No.: WO2018/060546
PCT Pub. Date: Apr. 5, 2018

(65) Prior Publication Data
US 2020/0029241 A1 Jan. 23, 2020

Related U.S. Application Data

(60) Provisional application No. 62/401,385, filed on Sep. 29, 2016.

(51) Int. Cl.
*H04W 4/00* (2018.01)
*H04W 28/02* (2009.01)
*H04W 84/04* (2009.01)
(52) U.S. Cl.
CPC ... *H04W 28/0263* (2013.01); *H04W 28/0205* (2013.01); *H04W 84/042* (2013.01)

(58) Field of Classification Search
None
See application file for complete search history.

(56) References Cited

U.S. PATENT DOCUMENTS

2012/0243462 A1\* 9/2012 Bucknell ........... H04W 72/1236
370/315
2013/0039278 A1 2/2013 Bouazizi et al.
(Continued)

FOREIGN PATENT DOCUMENTS

CL 201900838 8/2019
GB 2 525 416 A 10/2015
(Continued)

OTHER PUBLICATIONS

International Search Report and Written Opinion for Application No. PCT/FI2017/050619 dated Nov. 23, 2017, 10 pages.
(Continued)

*Primary Examiner* — Gerald A Smarth
(74) *Attorney, Agent, or Firm* — Alston & Bird LLP

(57) ABSTRACT

Communication includes transmitting first and second traffic flow packets via a first radio bearer to a second device; detecting that further second traffic flow packets will be transmitted via a second radio bearer to the second device; and transmitting a packet data unit via the first radio bearer to the second device to indicate a switch of the second traffic flow while first traffic flow packets are transmitted via the first radio bearer. Communication may also include receiving first and second traffic flow packets from a first device via a first radio bearer; receiving from the first device a packet data unit indicating that further second traffic flow packets will be received via a second radio bearer while the first traffic flow is received via the first radio bearer; and establishing the second radio bearer between the first and second devices.

25 Claims, 9 Drawing Sheets

(56) References Cited

U.S. PATENT DOCUMENTS

| | | | |
|---|---|---|---|
| 2013/0188490 A1* | 7/2013 | Morper | H04W 36/026 |
| | | | 370/235 |
| 2015/0201046 A1 | 7/2015 | Biswas | |
| 2015/0256453 A1* | 9/2015 | Laraqui | H04L 45/74 |
| | | | 370/392 |
| 2015/0264706 A1* | 9/2015 | Voigt | H04W 72/1263 |
| | | | 370/329 |
| 2016/0338102 A1* | 11/2016 | Nuggehalli | H04W 72/10 |
| 2019/0274159 A1 | 9/2019 | Lunttila et al. | |

FOREIGN PATENT DOCUMENTS

| | | |
|---|---|---|
| RU | 2337505 C2 | 10/2008 |
| RU | 2549159 C2 | 4/2015 |
| WO | WO 2005/002264 A1 | 1/2005 |

OTHER PUBLICATIONS

3GPP TS 36.300 V13.4.0, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13) (Jun. 2016), 310 pages.

Office Action and Search Report for Russian Application No. 2019108881/08 dated Nov. 22, 2019, 6 pages (no translation available).

Office Action and Search Report for Chilean Application No. 201900837 dated Jun. 15, 2020, 18 pages.

* cited by examiner

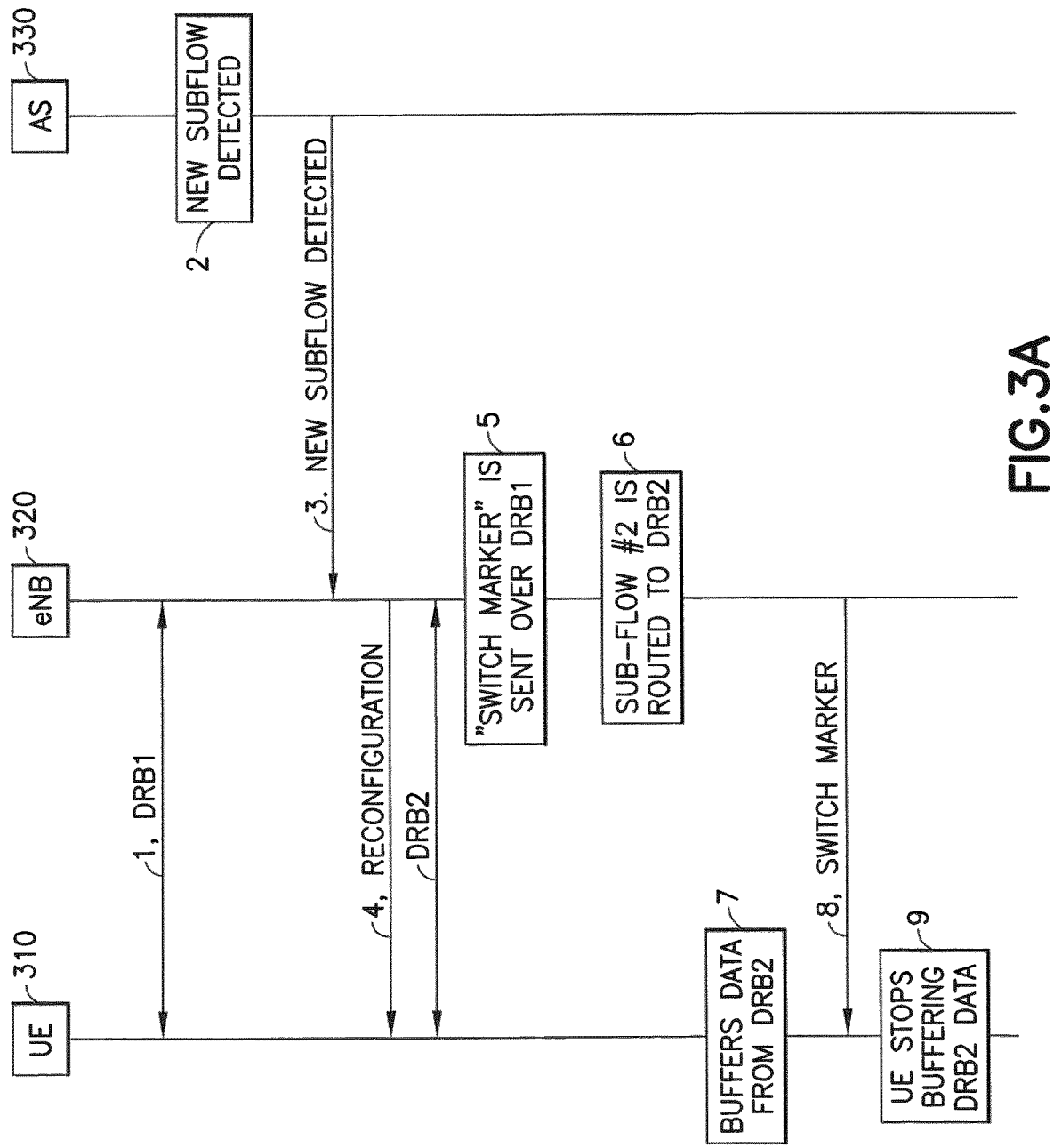

RADIO BEARER SWITCHING IN RADIO ACCESS

CROSS-REFERENCE TO RELATED APPLICATIONS

The present application is a national phase entry of International Application No. PCT/FI2017/050619, filed Sep. 4, 2017, which claims priority to U.S. Provisional Application No. 62/401,385, filed Sep. 29, 2016, all of which is incorporated herein by reference in its entirety.

TECHNICAL FIELD

The teachings in accordance with the example embodiments of this invention relate generally to QoS architecture in the 5$^{th}$ generation radio access and, more specifically, relates to a new mapping structure allowing more flexible data handling with less signalling overhead in radio access technologies, such as 5$^{th}$ generation radio access.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
5G Fifth Generations
API application programing interface
BS base station
CAF content awareness function
DRB Data Radio Bearer
eNB evolved Node B
FII Flow Identification Indicator
IF interface
IP Internet Protocol
MAC Medium Access Control
MNC-U Multi-Node Controller—User plane
NR New Radio
PDCP Packet Data Convergence Protocol
PDU packet data unit
PHY Physical Layer
QoE quality of experience
RAN radio access network
RB resource block
RLC Radio Link Control
RRC radio resource control
RRM Radio Resource Management
SeNB Source Evolved Node B
SSC Secondary Synchronization Code
TeNB Target Evolved Node B
UE User Equipment
AS Application Scheduler In 5G, it is expected that the radio access network (RAN) can create and modify data radio bearers (DRB) without requiring immediate signalling from the core network. This is in contrast of 4G/LTE systems, where DRBs are subject of an 1:1 mapping between access and core network by means of the EPS bearers. In 5G, this 1:1 mapping between access and core network logical structures is dissolved, and replaced by a 1:n mapping, meaning that the radio access can create and map data traffic from the core network and from the UE for a set of DRBs.

However, this new mapping structure, although allowing more flexible data handling with less signalling overhead, is currently not possible in LTE systems due to the protocol structure of the DRBs.

Further, it is noted that other radio technologies may also allow a similar use of radio bearers or such flexible use of data radio bearers between a transmitter and a receiver. This may be related to a system having access network and core/external network. But same issue may be faced also between two devices within an independent access network having no connection to core/external network. In addition, the same issue may be faced in device-to-device communication within an access network, with or without connection to core/external network At least the issues as indicated above are addressed in the example embodiments of the invention as described herein.

SUMMARY

This section contains examples of possible implementations and is not meant to be limiting.

In an exemplary aspect of the invention, there is a method, comprising: performing, by a communication device, a communication comprising transmitting packets of a first traffic subflow and packets of a second traffic subflow via a first radio bearer to a second device; detecting that further packets of the second traffic subflow are to be transmitted via a second radio bearer to the second device; and based on the detecting, transmitting a packet data unit via the first radio bearer to the second device, wherein the packet data unit comprises an indication of a switch of the second traffic flow to the second radio bearer, and wherein packets of the first traffic flow continues to be transmitted via the first radio bearer.

In a further example embodiment is a method comprising the method of the previous paragraph is that, based on the second radio bearer being established between the first device and the second device, there is transmitting further packets of the second traffic flow via the second radio bearer to the second device. An additional example embodiment is that, based on the detecting there is causing the second device to establish the second radio bearer. In accordance with the example embodiments of the invention the detecting comprises detecting that the further packets of the second traffic subflow are associated with an application that requires a higher priority. Another example embodiment includes receiving confirmation of reception of the packet data unit from the second device, wherein the confirmation of reception may be confirmation of in-order reception of the packet data unit, wherein the transmitting the further packets of the second traffic flow is based on the confirmation. In accordance with a further example embodiment, the packet data unit comprises a sequence number. In an additional example embodiment the sequence number causes in-sequence delivery of packets for the radio bearers at the second device. In another example embodiment the packet data unit causes the second device to deliver the packets belonging to the second traffic subflow to a higher layer of the second device. In yet another example embodiment of the invention the higher layer is an application layer. In still another example embodiment of the invention there is, prior to transmitting the second traffic flow to the second radio bearer of the second device, buffering the packets at the first device In another example embodiment of the invention, there is an apparatus comprising: means for performing, by a communication device, a communication comprising transmitting packets of a first traffic subflow and packets of a second traffic subflow via a first radio bearer to a second device; means for detecting that further packets of the second traffic subflow are to be transmitted via a second radio bearer to the second device; and means, based on the detecting, for transmitting a packet data unit via the first radio bearer to the second device, wherein the packet data unit comprises an indication of a switch of the second traffic flow to the second radio bearer, and wherein packets of the first traffic flow continues to be transmitted via the first radio bearer.

In another example embodiment of the invention there is an apparatus comprising: at least one processor; and at least one memory including computer program code, where the at least one memory and the computer program code are configured, with the at least one processor, to cause the apparatus to at least: perform, by a communication device, a communication comprising transmitting packets of a first traffic subflow and packets of a second traffic subflow via a first radio bearer to a second device; detect that further packets of the second traffic subflow are to be transmitted via a second radio bearer to the second device; and based on the detecting, transmit a packet data unit via the first radio bearer to the second device, wherein the packet data unit comprises an indication of a switch of the second traffic flow to the second radio bearer, and wherein packets of the first traffic flow continues to be transmitted via the first radio bearer.

A further example embodiment of the invention is an apparatus comprising the apparatus of any of the previous paragraphs wherein at least one memory including computer program code is configured with at least one processor to cause the apparatus to: based on the second radio bearer being established between the first device and the second device, transmit further packets of the second traffic flow via the second radio bearer to the second device. An additional example embodiments is wherein the at least one memory including the computer program code is configured with the at least one processor to cause the apparatus to: based on the detecting, causing the second device to establish the second radio bearer. In accordance with the example embodiments of the invention the detecting comprises detecting that the further packets of the second traffic subflow are associated with an application that requires a higher priority. A further example embodiment is wherein the at least one memory including the computer program code is configured with the at least one processor to cause the apparatus to: receive confirmation of reception of the packet data unit from the second device, wherein the confirmation of reception may be confirmation of in-order reception of the packet data unit, wherein the transmitting the further packets of the second traffic flow is based on the confirmation. In another example embodiment of the invention the packet data unit comprises a sequence number. In another example embodiment the sequence number causes in-sequence delivery of packets for the radio bearers at the second device. In another example embodiment the packet data unit causes the second device to deliver the packets belonging to the second traffic subflow to a higher layer of the second device. In still another example embodiment of the invention the higher layer is an application layer. In yet another example embodiment there is, prior to transmitting the second traffic flow to the second radio bearer of the second device, buffering the packets at the first device.

In a further example embodiment of the invention there is a method, comprising: receiving from a first device a communication comprising packets of a first traffic subflow and packets of a second traffic subflow via a first radio bearer; receiving from the first device a packet data unit comprising an indication that further packets of the second traffic subflow are to be received via a second radio bearer, wherein the first traffic flow continues to be received via the first radio bearer; establishing the second radio bearer between a second device and the first device; and based on the establishing, receiving the further packets of the second traffic flow via the second radio bearer.

In a further example embodiment of the invention is a method comprising the method of the previous paragraph, there is receiving instructions to establish the second radio bearer. In another example embodiment there is sending confirmation of reception of the packet data unit to the first device, wherein the confirmation of reception may be confirmation of in-order reception of the packet data unit, wherein the further packets of the second traffic flow is received based on the confirmation. In an example embodiment the packet data unit comprises a sequence number. In another example embodiment the sequence number enables in-sequence delivery of packets for the radio bearers. In a further example embodiment the packet data unit enables the second device to deliver the packets belonging to the second traffic subflow to a higher layer of the communication device. In still another example embodiment the higher layer is an application layer. In yet another example embodiment there is, prior to receiving the packet data unit buffering the second traffic flow at the second device, wherein delivering the packets belonging to the traffic subflow to the higher layer is performed only after receiving the packet data unit.

In another example embodiment of the invention, there is an apparatus comprising: means for receiving from a first device a communication comprising packets of a first traffic subflow and packets of a second traffic subflow via a first radio bearer; means for receiving from the first device a packet data unit comprising an indication that further packets of the second traffic subflow are to be received via a second radio bearer, wherein the first traffic flow continues to be received via the first radio bearer; establishing the second radio bearer between the second device and the first device; and means, based on the establishing, for receiving the further packets of the second traffic flow via the second radio bearer.

In another example embodiment of the invention there is an apparatus comprising: at least one processor; and at least one memory including computer program code, where the at least one memory and the computer program code are configured, with the at least one processor, to cause the apparatus to at least: receive from a first device a communication comprising packets of a first traffic subflow and packets of a second traffic subflow via a first radio bearer; receive from the first device a packet data unit comprising an indication that further packets of the second traffic subflow are to be received via a second radio bearer, wherein the first traffic flow continues to be received via the first radio bearer; establishing the second radio bearer between the second device and the first device; and based on the establishing, receive the further packets of the second traffic flow via the second radio bearer.

A further example embodiment of the invention is an apparatus comprising the apparatus of any of the previous paragraphs wherein at least one memory including computer program code is configured with at least one processor to cause the apparatus to: receive instructions to establish the second radio bearer. In another example embodiment the at least one memory including the computer program code is configured with the at least one processor to cause the apparatus to: send confirmation of reception of the packet data unit to the first device, wherein the confirmation of reception may be confirmation of in-order reception of the packet data unit, wherein the further packets of the second traffic flow is received based on the confirmation. In an additional embodiment the packet data unit comprises a sequence number. In another example embodiment the sequence number enables in-sequence delivery of packets for the radio bearers. In another example embodiment the packet data unit enables the second device to deliver the packets belonging to the second traffic subflow to a higher layer of the communication device. In still another example embodiment the higher layer is an application layer. In yet another example embodiment there is, prior to receiving the packet data unit, buffering the second traffic flow at the second device, and wherein delivering the packets belonging to the traffic subflow to the higher layer is performed only after receiving the packet data unit.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 3a shows a message flow chart in accordance with an example embodiment of the invention;

DETAILED DESCRIPTION

In various embodiments, we propose an improved mapping structure allowing more flexible data handling with less signalling overhead in radio access.

An example embodiment of the invention addresses the QoS architecture as for example in the $5^{th}$ generation radio access, also called "new radio" (NR) or "NextGen" (NG) in 3GPP standardization context.

Figure 1:
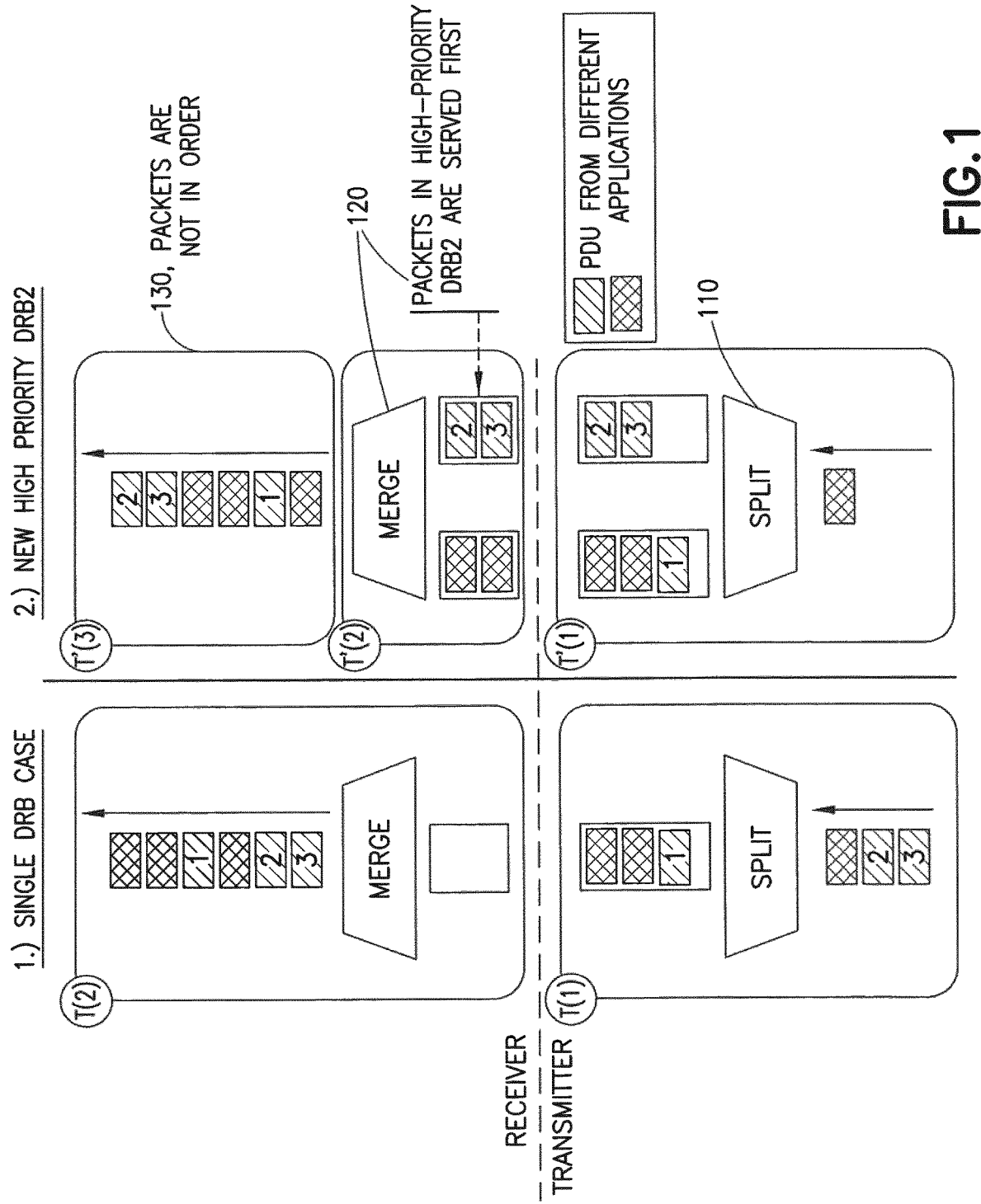
FIG. 1 shows example of packet not in-order case when a new DRB2 is created.

FIG. 1 shows packet handling from a transmitter to a receiver as performed in a 1.) Single DRB case, and in a 2.) New high priority DRB2. In this example a data radio bearer (DRB) is configured and transports data from several applications. At some point, it is detected by the transmitter that one or several applications must be prioritized and the associated data should be handled separately. This detection can happen after transmission from the to-be-prioritized applications(s) has started. Further, this detection can be done on the fly. For example when a user is browsing and/or begins an IP call. This operation can be for at least the reasons that:

1. The function which detects the traffic flow (e.g. CAF-RAN) may need some time (a few packets)—before that, the traffic flow is mapped to a "default DRB" or default Data Radio Bearer; and/or
2. The QoS requirement of the flow may change, which may also lead to a DRB switch As a consequence, a new DRB is created to carry the packets of these applications. The "split" function 110 will split the data into two DRBs, DRB 1 and DRB2. The prioritized data will be routed by the split function to DRB2.

Now, due to the higher priority of DRB2, there is no guarantee that the packets of the identified applications will arrive in order at the receiving entity. This can lead to severe degradation of user experience, and violates the in-sequence delivery principle in case that this is configured for the specific service.

For example, we can assume that packets from the application that are to be prioritized are numbered e.g., 1, 2, 3. In a first case (i.e., single DRB case) there is only one DRB configured (at T(1)), and then all the packets are transmitted in order and received at T(2).

In a second case, a second DRB is created, and at T'(1), the packets #2 and #3 are handled by the new DRB.

They are received at time T'(2), before the transmission of packet #1 which is still in the low priority DRB. The result is that after the merge 120 of DRB (T'(3)), as shown in block 130, packets #2 and #3 are delivered to higher layers before packet #1 which breaks in order delivery.

The packet #1 may be received by higher layers due to the reason that queues of high priority DRB are served first in receiver side, as discussed in above embodiment. However, packets sent via the low priority DRB may experience delay also in queues in transmitter side.

It is noted that in the operations as described above:
1. The detection of the application could take time (not at the first packet);
2. The creation of the DRB takes time. And it is not possible or beneficial to stop any transmission during the reconfiguration; and/or
3. The detection could happen in the other side for example in eNB, but the switch has to take place in UE. In this case some packet may have been handled in the UE before it is notified by the eNB about the new flow.

An example embodiment of the invention allows keeping an in-sequence delivery of packets for a subflow that needs to be sent in another DRB, without requiring another sequence number.

Figure 2:
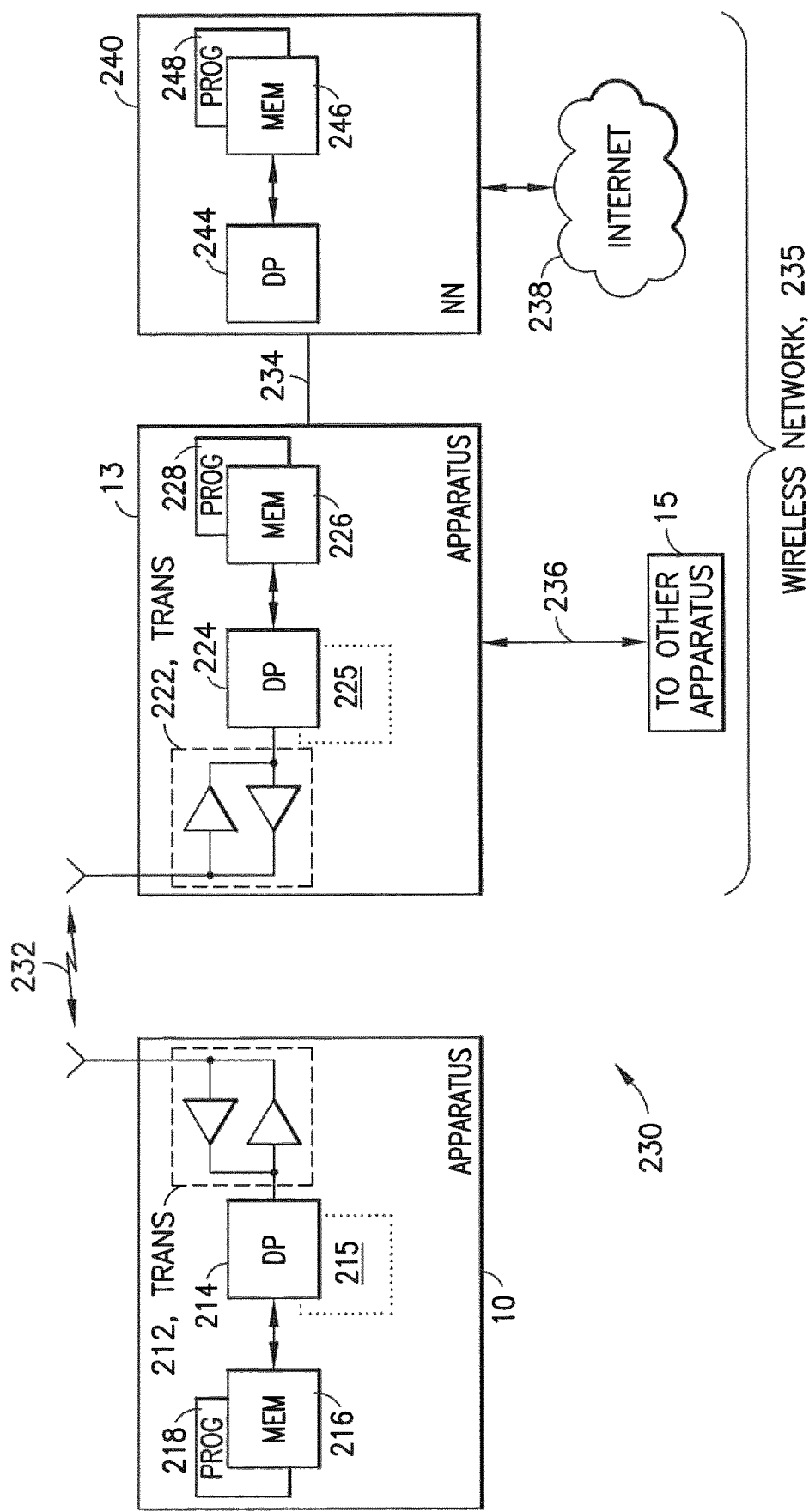
FIG. 2 shows a simplified block diagram of a system in which exemplary embodiments of this invention may be practiced.

Before describing the example embodiments of the invention in further detail reference is now made to FIG. 2. FIG. 2 illustrates a simplified block diagram illustrating some components of the wireless system shown in FIGS. 1 and 2. Referring also to FIG. 2, in the wireless system 230 a wireless network 235 is adapted for communication over a wireless link 232 with a first apparatus, such as a mobile communication device which may be referred to as an apparatus 10, via second apparatus such as a network access node, e.g., a Node B (base station), and more specifically an apparatus 13 such as shown in FIG. 2. The network 235 may include a network node NN 240 that may include MME/S-GW and/or application server (AS) functionality, and which provides connectivity with a network, such as a telephone network and/or a data communications network (e.g., the internet 238). The NN 240 may include a WLAN access point as in accordance with an example embodiment of the invention.

The first apparatus 10 comprise a controller, such as a computer or a data processor (DP) 214, a computer-readable memory medium embodied as a memory (MEM) 216 that stores a program of computer instructions (PROG) 218. The first apparatus may include also a suitable wireless interface, such as radio frequency (RF) transceiver 212, for bidirectional wireless communications with the second apparatus 13 using the data path 232. The PROG 218 can include computer instructions that, when executed by a processor, such as the DP 214, operates in accordance with example embodiments of the invention.

The apparatus 13 also includes a controller, such as a computer or a data processor (DP) 224, a computer-readable memory medium embodied as a memory (MEM) 226 that stores a program of computer instructions (PROG) 228, to perform the operations in accordance with example embodiments of the invention as described herein. In addition, a suitable wireless interface, such as RF transceiver 222, for communication with the apparatus 10 via one or more antennas is shown in FIG. 2. However, although shown in FIG. 2 this wireless interface is not limiting as it may or may not be part of the apparatus 13 as shown. The apparatus 13 is coupled via a data/control path 234 to the NN 240. The path 234 may be implemented as an interface, such as an S1 interface. The apparatus 13 may also be coupled to other apparatus 15 via data/control path 236, which may be implemented as an interface. The other apparatus 15 may have similar configurations and components as the apparatus 13. In addition, although not shown in FIG. 2, this data/control path 234 can also be a wireless connection or can be a combination of wired and wireless connections.

The NN 240 includes a controller and/or application server, such as a computer or a data processor (DP) 244, a computer-readable memory medium embodied as a memory (MEM) 246 that stores a program of computer instructions (PROG) 248 and possibly a suitable wireless interface, such as radio frequency (RF) transceiver 242, for bidirectional wireless communications with the apparatus 10 and the apparatus 13 via path 234.

At least one of the PROGs 218, 228 and 248 is assumed to include program instructions that, when executed by the associated DP, enable the device to operate in accordance with example embodiments of this invention, as will be discussed below in greater detail. That is, various example embodiments of this invention may be implemented at least in part by computer software executable by the DP 214 of the apparatus 10; by the DP 224 of the apparatus 13; and/or by the DP 244 of the NN 240, or by hardware, or by a combination of software and hardware (and firmware).

For the purposes of describing various example embodiments in accordance with this invention the apparatus 10 and the apparatus 13 may also include dedicated processors, for example Control module 215 and a corresponding Control module (CM) 225. Control module 215 and Control module 225 may be constructed so as to operate to perform at least the flow control operations as in accordance with various example embodiments in accordance with this invention. In accordance with an example embodiment of the invention at least the Control modules 215 and 225 are configurable to perform at least the flow control operations as in accordance with various example embodiments in accordance with this invention The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

The example embodiments of the invention may assume that at least some packets of subflow X are sent via DRB1 before noticing that the flow requires DRB2 providing better QoS [or before being able to transmit packet of the flow to DRB2]. To provide in-order reception there is at least the following:
All the traffic is sent over a first radio bearer (DRB1);
The transmitter becomes aware that the traffic comprises more than one subflow and that let's say second subflow is related to application requiring better QoS and thus needs to be routed to a new radio bearer (DRB2);
DRB2 is established;
The transmitter sends a specific Switch-marker packet over DRB1 (wherein the packet may have a sequence number) identifying that no more packet belonging to second subflow will be transmitted over DRB1 and will be transferred instead over DRB2;
The transmitter switches traffic of the second sub flow to DRB2.
A first alternative (to avoid our-of-order reception):
The receiver buffers packets received via DRB2; and
When the Switch marker is received, the receiver delivers to higher layers the packets buffered in the second radio bearer.
A second alternative:
The transmitter buffers packets to be transmitted over DRB2;
The receiver sends a confirmation of the reception of the Switch marker to the transmitter; and
The transmitter then begins the transmission on DRB2.

Example embodiments of the invention work, for example, with a case of the addition of a second DRB (DRB2) when a first DRB (DRB1) is already established.

In regards to some non-limiting related operations it is noted that:
All the traffic is may be sent over a first radio bearer (DRB);
The transmitter may become aware that
 The traffic comports two sub flows (first sub flow and second sub flow), that it is able to distinguish.
 Traffic on the second sub flow may need to be routed to a new radio bearer;
A second radio bearer is established;
The transmitter may send a specific Switch-marker packet over the first radio bearer that has a sequence number and identifying that no more packet belonging to second sub flow will be transmitted over the first radio bearer and will be transferred instead over the second radio bearer; and/or
The transmitter may switch traffic of the second sub flow to the second radio bearer. All the packets belonging to the second sub flow are mapped to the second radio bearer from this moment on.

Further, it is noted that the transmitter may become aware that the traffic comports two subflows after already starting transmission of second subflow. This may be for at least the reasons that:

the detection of the application could take time (not at the first packet);

the creation of the DRB takes time. It is not possible to stop any transmission during the reconfiguration; and/or the detection could happen in the other side for example in eNB, but the switch has to take place in UE. In this case some packet may have been handled in the UE before it is notified by the eNB about the new flow.

There are several possibilities how new subflows can be detected in NB or UE:

based on meta-information added to the transport (tunnel) packets (e.g. in the header field) by a function in the core network. This meta-information could also be transferred to the UE;

Based on 5-tuple or similar rules in the NB or in the UE; similar as the traffic-flow template (TFT) mechanism in LTE;

Based on heuristics which take application-layer information into account, such as:

Application-layer protocol (e.g., HTTP, RTP, QUIC, FTP, others),

Control signaling exchanged on application layer (e.g., http-get with information about object names, locations, types, and sizes), Media content information (e.g., MIME types, as found in http get request), Deep packet inspection of user application data;

Based on heuristics which take use statistical methods to identify traffic based on typical packet patterns (e.g., packet sizes, inter-arrival times, UL/DL sequences); and/or Based on direct notification by APIs, e.g., if an app starts a new traffic flow or opens a socket and sends traffic.

As currently envisioned Flow Identification Indicator (FII) can use a Traffic Mark set by the CN UP on DL UP traffic sent to the (CAF-) RAN. This marking is based on rules received from the CN CP and may e.g. identify traffic of applications detected by the CN UP function and/or traffic subject of a specific charging. The FII marking is not meant to directly control the QoS behaviour in the RAN: the QoS behaviour in the RAN is controlled by QoS rules that may refer to FII and that are sent by the CN CP to the CAF-RAN. The FII is used on NG3 on a per-packet basis. Traffic to and from a UE may be associated with the same FII.

Based on the output of application detection enforced in the CN UP functions, different PDU within the same flow (e.g. with the same 5 Tuple in case of a PDU session for IP traffic) may be associated by the CN UP with different FII values. This assumes the transport protocol handles different streams for this kind of traffic Further, in a current proposal a UE can determine the SSC mode required for an application using at least one of the following methods:

1. The app that starts a new flow (i.e. opens a new socket) indicates the type of session continuity required by this flow. This may be indicated by using the sockets API extensions. In other words, the app may use already specified software APIs to indicate what type of session continuity is required. For example, if the app requests a socket with a nomadic IP address, essentially, the app requests SSC mode; and/or 2. If the app requests a socket with a fixed IP address or a sustained IP address, essentially, the app requests SSC mode 1 or SSC mode 3 respectively.

If the app that starts a flow does not indicate the type of required session continuity, the UE may determine the required session continuity by using provisioned policy In accordance with example embodiments of the invention a CAF-RAN node or device can perform these operations for new flow detection. The CAF-RAN can be incorporated in any of the devices apparatus 13, NN 240, and/or the apparatus 10 as shown in FIG. 2.

In one possibility, detection may be performed by receiving a packet which comprises certain IP-5-tuple or marking (FII) set by CN entity. In short, DL data packet itself comprises an indication that the packet is part of flow requiring higher priority. In another possibility the CAF-RAN function can performs detection based on analytics of the application traffic based on one or more packets that identify the traffic type.

Further, detection of a new flow could be based on the analysis of several packets. The full identification of a new flow could be based on an analysis of a few consecutives packets. Note that this applies also to the case if packet marking is used: in an ongoing application flow, the application detection function (either in CN or in RAN) is able to detect the traffic type only after some time and then changes the packet marking. Then, the remaining packets of ongoing application traffic flow would need to be transferred over a new DRB.

In addition, a QoS policy can also indicate that the identified flow requires higher priority. Thus, QoS framework and RRC handling of 5G can support detection of flows in Network side, and DRB configuration initiated by Network, which is then transferred to the UE. In another embodiment UE may create DRB by itself dynamically.

Example embodiments of the invention work to provide a context and/or an application-aware function in RAN (e.g., in a base station). This provides the capability to separate flows based on several criteria, for example, from simple IP-5-tuple to advanced machine learning based approaches. Further, this function is able to guide RRC in NR BS to map traffic to DRBs. Additionally, this can also be done based on packet marking on RAN-CN IF, in case that such a function is (also) located in CN.

A first operation in accordance with the example embodiments, includes:

The receiver (Transceiver 222 and/or 212 as in FIG. 2) buffers received PDCP packets received via in the second radio bearer; and When the Switch marker is received, the receiver (Transceiver 222 and/or 212, DP 224 and/or 214 w MEM 226 and/or 216, and CM 225 and/or 215 as in FIG. 2) delivers to higher layers the packets buffered in the second radio bearer.

It is noted that in the prior art there is for example an end Marker, and the use case is handover and is involving only one bearer. Whereas, in accordance with an example embodiment of the invention, the switch marker does not signal the end of the transmission, but only the end of part of it (the second flow). In accordance with the example embodiments, the packets continue to arrive in first RB. Which is not the case in prior art. If we apply prior art to the first option, the receiver would stop handling any packets coming from RB1.

Further, in accordance with example embodiments of the invention there is added a sequence number which is not present in prior art. This added sequence number is used because the packets may be received out of order in the receiving buffer, in case of split bearer for example. In prior art there is no possibility to have a split connection and thus out of order reception of packets.

In a second operation in accordance with example embodiments of the invention:

The transmitter (Transceiver 222 and/or 212 as in FIG. 2) buffers PDCP packets over the second radio bearer;

The PDCP layer of the receiver (Transceiver 222 and/or 212, DP 224 and/or 214 w MEM 226 and/or 216, and CM 225 and/or 215 as in FIG. 2) sends a confirmation of the reception and handling of the Switch marker to the transmitter; and The transmitter (Transceiver 222 and/or 212, DP 224 and/or 214 w MEM 226 and/or 216, and CM 225 and/or 215 as in FIG. 2) then begins the transmission on second radio bearer.

A detailed implementation of the first operation is described with regards to FIG. 3*a*. In this example the transmitter is the eNB and the receiver is the UE, but the roles could be exchanged.

FIG. 3*a* illustrates a message flow in accordance with the first option of example embodiments of the invention. As shown in FIG. 3*a*:

1. In the eNB 320 or apparatus (e.g., apparatus 13 as in FIG. 2), at flow 1 a DRB1 is established with the UE 310 (e.g., apparatus 10 as in FIG. 2) and carries all the traffic (Transceiver 222 and/or 212, DP 224 and/or 214 w MEM 226 and/or 216, and CM 225 and/or 215 as in FIG. 2);
2. The Application Scheduler AS 330 or an apparatus (e.g., apparatus 13 and/or NN 240 as in FIG. 2) in the network detects in flow 3 a new Application and identify a new subflow 2 in the traffic. The "Application Scheduler" is the entity in the Network (e.g., wireless network 235 as in FIG. 2) that is able to detect new application (Flow). The detection of the second flow could be based on packet inspection or via signaling;
3. The Application scheduler 330 (e.g., apparatus 13 and/or NN 240 as in FIG. 2) informs the eNB 320 (apparatus 13; Transceiver 222, DP 224 and/or 244 w MEM 226 and/or 246, and CM 225 as in FIG. 2) with flow 3 that a new subflow is detected and needs to be carried with higher priority;
4. eNB 320 reconfigures (apparatus 13, DP 224 and/or 244 w MEM 226 and/or 246, and CM 225 as in FIG. 2), as shown with flow 4, the UE 310 to add a new DRB: DRB2;
5. eNB 320 creates (apparatus 13, DP 224 and/or 244 w MEM 226 and/or 246, and CM 225 and/or DP 244 as in FIG. 2) a Switch-marker PDU as shown with block 5. This PDCP PDU has a PDCP Sequence Number so that it can be reordered with other PDCP PDU that contains data;
6. As shown with block 6, the eNB 320 routes (apparatus 13, Transceiver 222, DP 224 and/or 214 w MEM 226 and/or 216, and CM 225 and/or DP 244 as in FIG. 2) sub-flow #2 data to DRB2;
7. In block 7 the UE 310 (e.g., apparatus 10 as in FIG. 2) buffers data (Transceiver 212, DP 214 w MEM 216, and/or CM 225 215 as in FIG. 2) arriving on DRB2;
8. Switch Marker Packet is received by the UE 310 as shown with flow 8; and
9. UE 310 then stops buffering DRB2 data and delivers it to higher layer.

The PDCP layer deliver to higher layers the SDU in the same order as they have been submitted. The SN is used to reorder the packets when lower layer (RLC) can't provide this function. For normal case (single connectivity), the lower layer (RLC) provide in-order delivery. As indicated in step 5 above, for example in case of Handover, the PDCP layer re-orders the PDU received out of order (because of the handover), based on the PDCP sequence number. When a split bearer is set up (dual connectivity), the PDCP constantly re-order the PDCP PDU received from different radio links, based on the PDCP SN. Giving a SN to the switch marker, as in step 8 above, allows to be sure and stop buffering as in step 9 above since there is no more packet from a further subflow delivered to higher layers on first RB after the marker has been processed. This is because no packet from the further subflow is sent after the marker and that the packets are delivered in order by PDCP to higher layer.

Figure 3B:
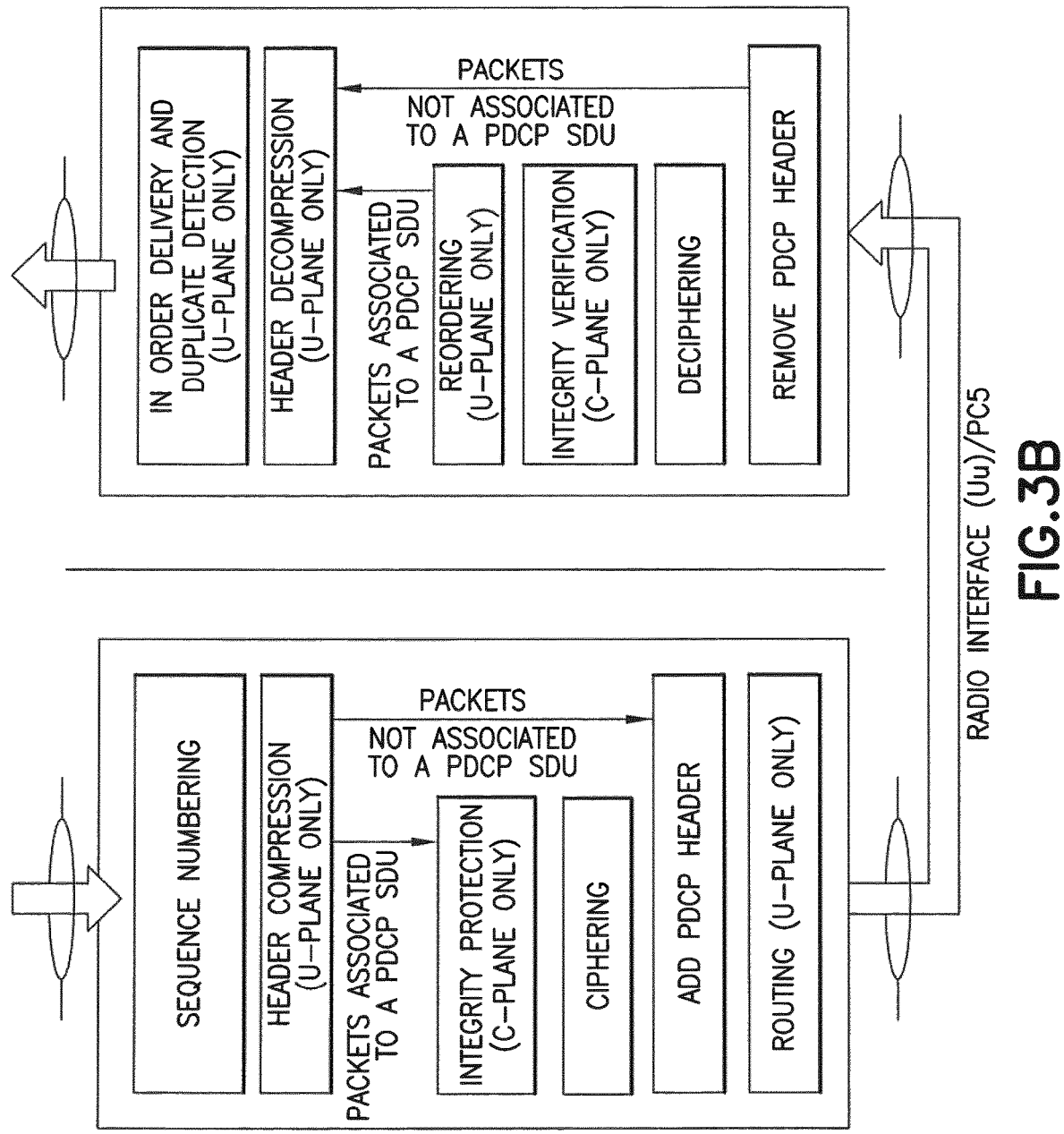
FIG. 3b shows a PDCP layer, functional view as shown in FIG. 4.2.2.1 of 3GPP TS 36.323 V13.2.1 (2016 June)

FIG. 3*b* represents the functional view of the PDCP entity for the PDCP sublayer which shows a PDCP layer. This figure is based on the radio interface protocol architecture. With regards to FIG. 3*b*, the PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for. For RNs, integrity protection and verification are also performed for the u-plane. For split bearers, routing is performed in transmitting PDCP entity, and reordering is performed in the receiving PDCP entity. Further, for LWA bearers, routing is performed in the transmitting PDCP entity and reordering is performed in the receiving PDCP entity. The transmitting PDCP entity of the UE may only submit the PDCP PDUs to the associated AM RLC entity.

Figure 4:
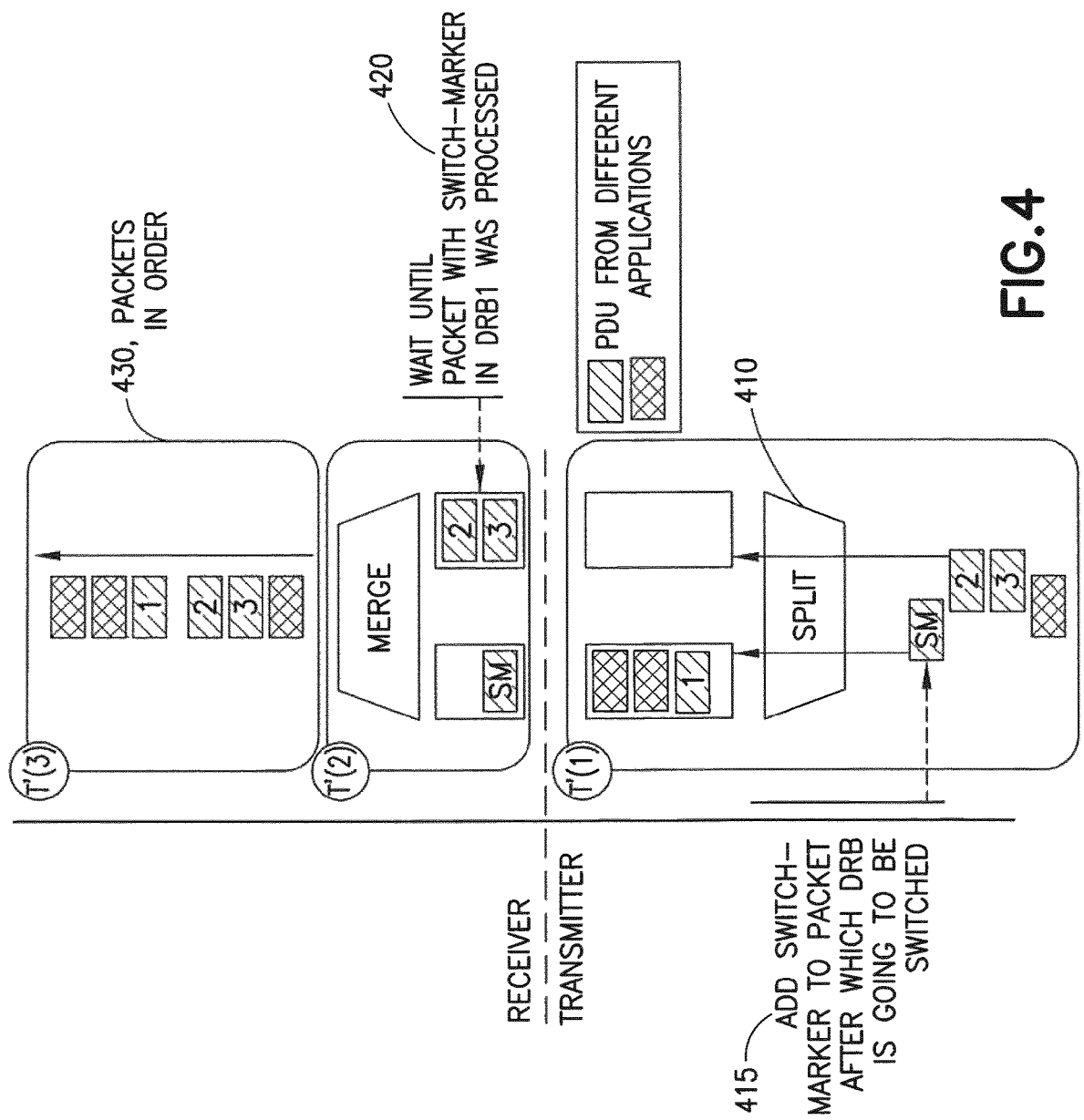
FIG. 4 shows an illustration of Packet Handling in accordance with an example embodiment of the invention.

FIG. 4 shows an illustration of Packet handling in accordance with example embodiments of the invention. As shown in FIG. 4 at block 410 a new DRB is created and the split function will add the switch marker 430 to a packet after which DRB is going to be switched. At block 420 of FIG. 4 it is shown that the merge function will wait until the packet with the switch marker in the DRB1 is processed. Then as shown in block 430, in accordance with the example embodiments, all packets including the merged packets are scheduled with the DRB1 packets so that the packets are in an order of highest priority to lowest priority.

A detailed implementation of the second option in accordance with example embodiments of the invention is described below with reference to FIG. 5.

Figure 5:
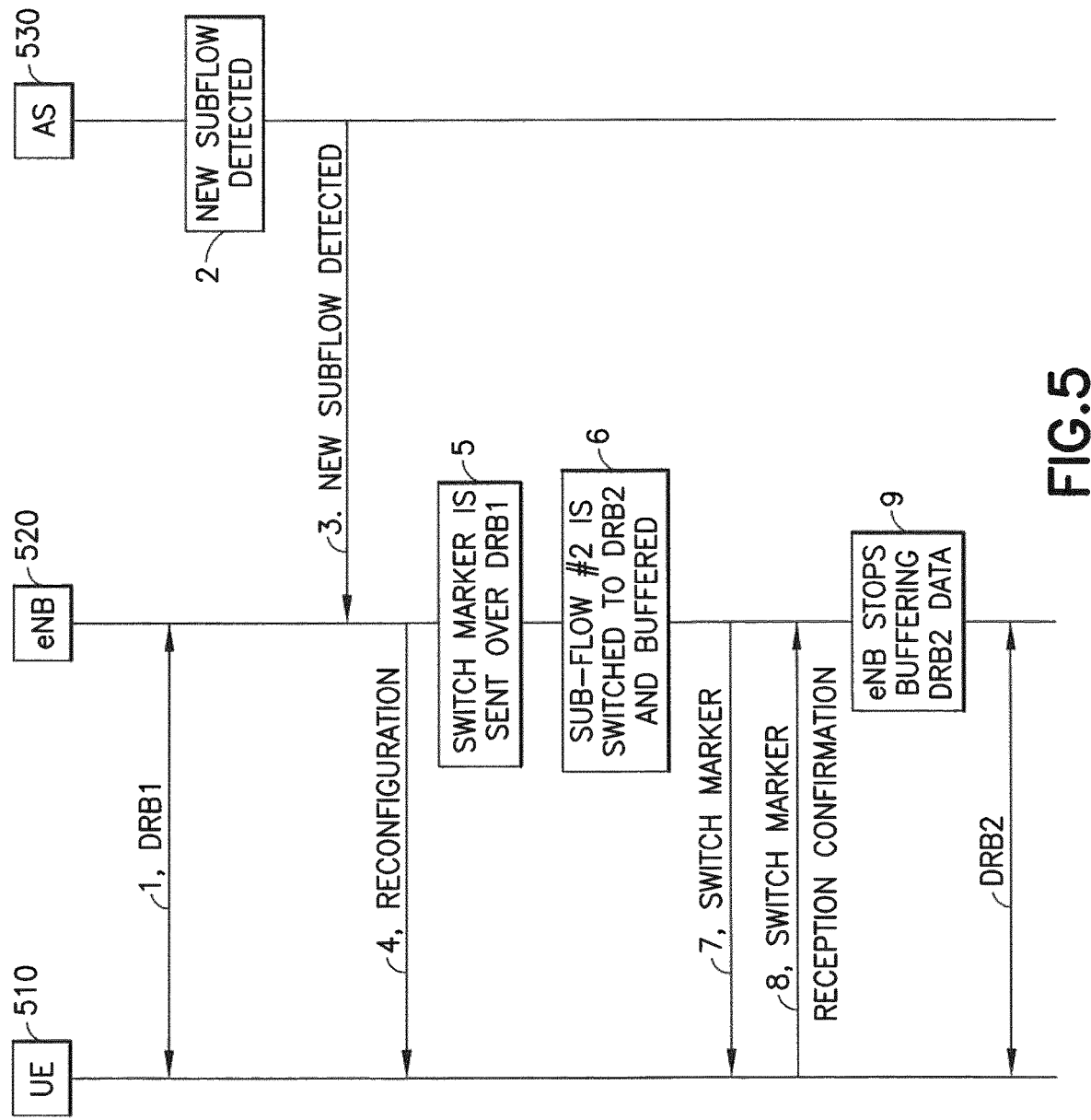
FIG. 5 shows another message flow in accordance with an example embodiment of the invention.

FIG. 5 illustrates another message flow in accordance with example embodiments of the invention. As shown in FIG. 5:

1. In the eNB 520 or apparatus (e.g., apparatus 13 as in FIG. 2), a DRB1 is established and carries all the traffic as shown with flow 1;
2. Then as shown by block 2 the Application Scheduler (AS 530) or an apparatus (e.g., apparatus 13 and/or NN 240 as in FIG. 2) in the network detects a new Application and identify a new subflow in the traffic;
3. The Application scheduler 530 (e.g., apparatus 13 and/or NN 240 as in FIG. 2) informs (Transceiver 222, DP 224 and/or 244 w MEM 226 and/or 246, and CM 225 as in FIG. 2) the eNB 520 that a new subflow is detected and needs to be carried with higher priority, as shown by flow 3;

4. As shown with flow 4, the eNB 520 reconfigures the UE 510 to add a new DRB: DRB2;
5. eNB 520 creates an Switch-Marker PDU and send it via DRB1 as shown by block 5. This PDCP PDU has a PDCP Sequence Number so that it can be reordered with other PDCP PDU that contains data;
6. As shown by block 6 of FIG. 5, eNB 520 switches sub-flow #2 data to DRB2 and buffers the data. No data belonging to DRB2 is sent over the air;
7. Switch Marker Packet is received by UE 510 as shown by flow 7;
8. Then as shown by flow 8 of FIG. 5 the UE 510 confirms the in-order reception and handling of the of switch marker: the switch marker has been received and all the PDU whose SN is below the switch marker have been delivered to higher layer. This mean that there will be no more PDU from the sub-flow #2 delivered to higher layer in DRB1; and
9. As shown by block 9, the eNB 520 stops buffering data in DRB2 and resume normal operation.

As similarly stated above, in accordance with an example embodiment of the invention as described in the options above, confirmation of in-order reception of the packet data unit may be sent by the UE 510, wherein the transmitting the further packets of the second traffic flow is based on the confirmation.

In this regards, assuming that a split bearer (e.g., 2 radio links) in the 1st Radio Bearer the example embodiments may comprise one or more aspects of the following:
1. PDU(SN=1) is sent by transmitter (via RL1). This is a PDU belonging to 2nd subflow;
2. "switch marker PDU" (SN=2) is sent by transmitter (via RL2); RL2 is faster than RL1;
3. "switch marker PDU" (SN=2) is received by receiver, where the switch marker may be received over DRB1; and
4. PDU(SN=1) is received by receiver.

In a scenario such as above the PDCP entity may store PDU with SN=2 and wait for the PDU(SN=1) to be received before delivering PDU(SN=2) to higher layers. If a 2nd radio bearer is launched (and the 2nd subflow PDUs are delivered to higher layers) at T=3. Then PDU(SN=1) is still being transmitted. In this case the launch of 2nd radio bearer, may be triggered by T=4. This can be "in order reception" of switch marker. Or else if the "reception of switch marker" is T=4, then there is no issue with a reorder.

Further, the example embodiments may comprise one or more aspects of the following:
1. PDU(SN=1) is sent by transmitter (via RB1). This is a PDU belonging to 2nd subflow.
2. "switch marker PDU" (SN=2) is sent by transmitter (via RB1) The PDU are using different path (radio link)
3. "switch marker PDU" (SN=2) is received by receiver over RB1
4. PDU(SN=1) is received by receiver over RB1

The example embodiments allow to keep the in-sequence delivery of packets for a subflow that needs to be sent in another DRB, without requiring another of Sequence Number.

It is noted that in short, in option 1 buffering may be done in receiver, until receiving message from transmitter that ok to send packets from DRB2 receiver buffer to higher layers. In option 2 buffering may be done in transmitter, until receiving confirmation from receiver that ok to send packets via DRB2.

Figure 6:
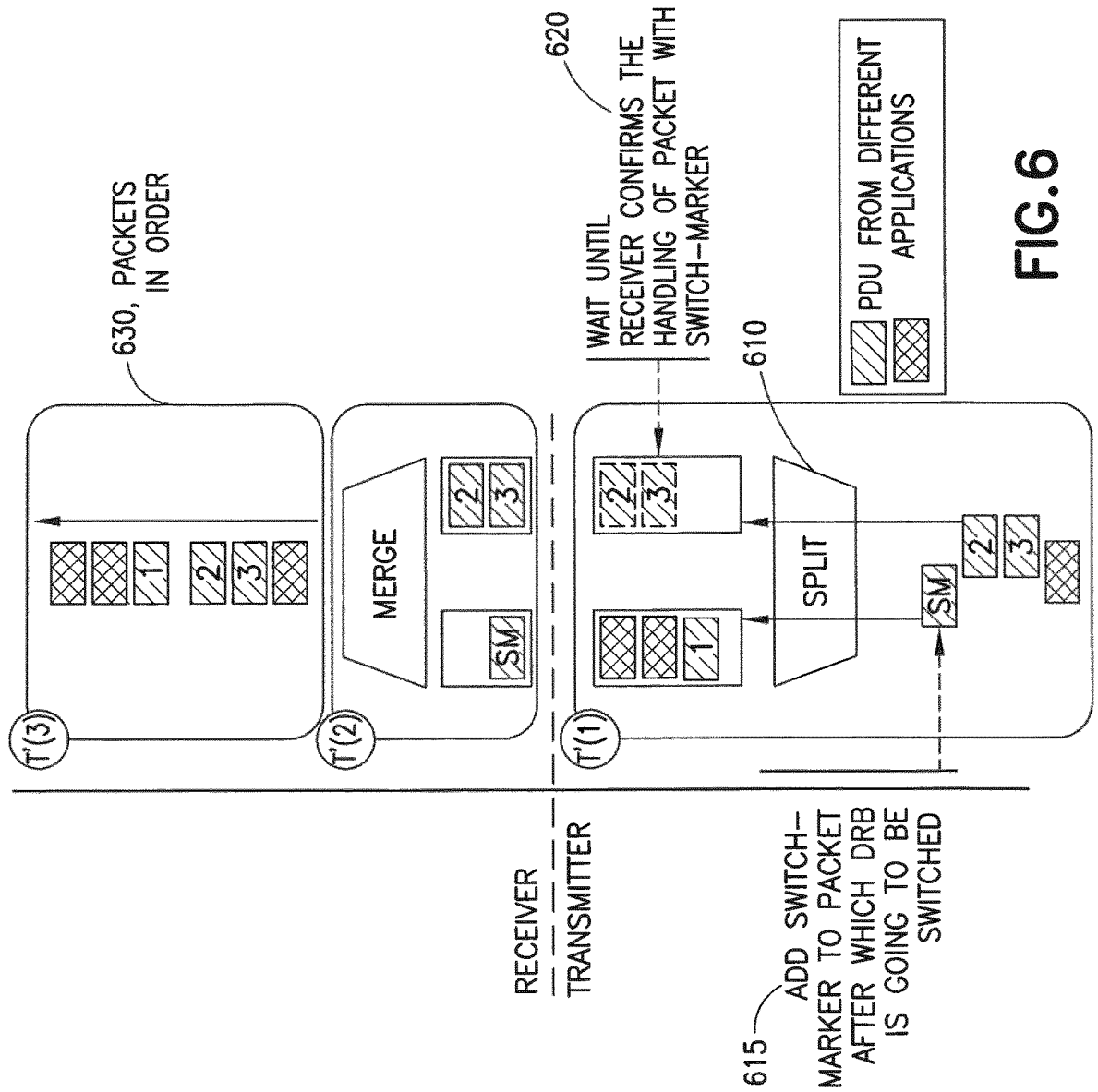
FIG. 6 shows another illustration of Packet Handling in accordance with an example embodiment of the invention.

FIG. 6 shows another illustration of packet handling in accordance with example embodiments of the invention. As shown in FIG. 6 at block 610 a new DRB is created and as shown in block 615 the split function will add the switch marker to packet after which DRB is going to be switched. At block 620 of FIG. 4 it is shown that the merge function will wait until the receiver confirms the handling of packet with the switch-marker. Then as shown in block 630, in accordance with the example embodiments, all packets including the merged packets are scheduled in an order of highest priority to lowest priority.

Figure 7A:
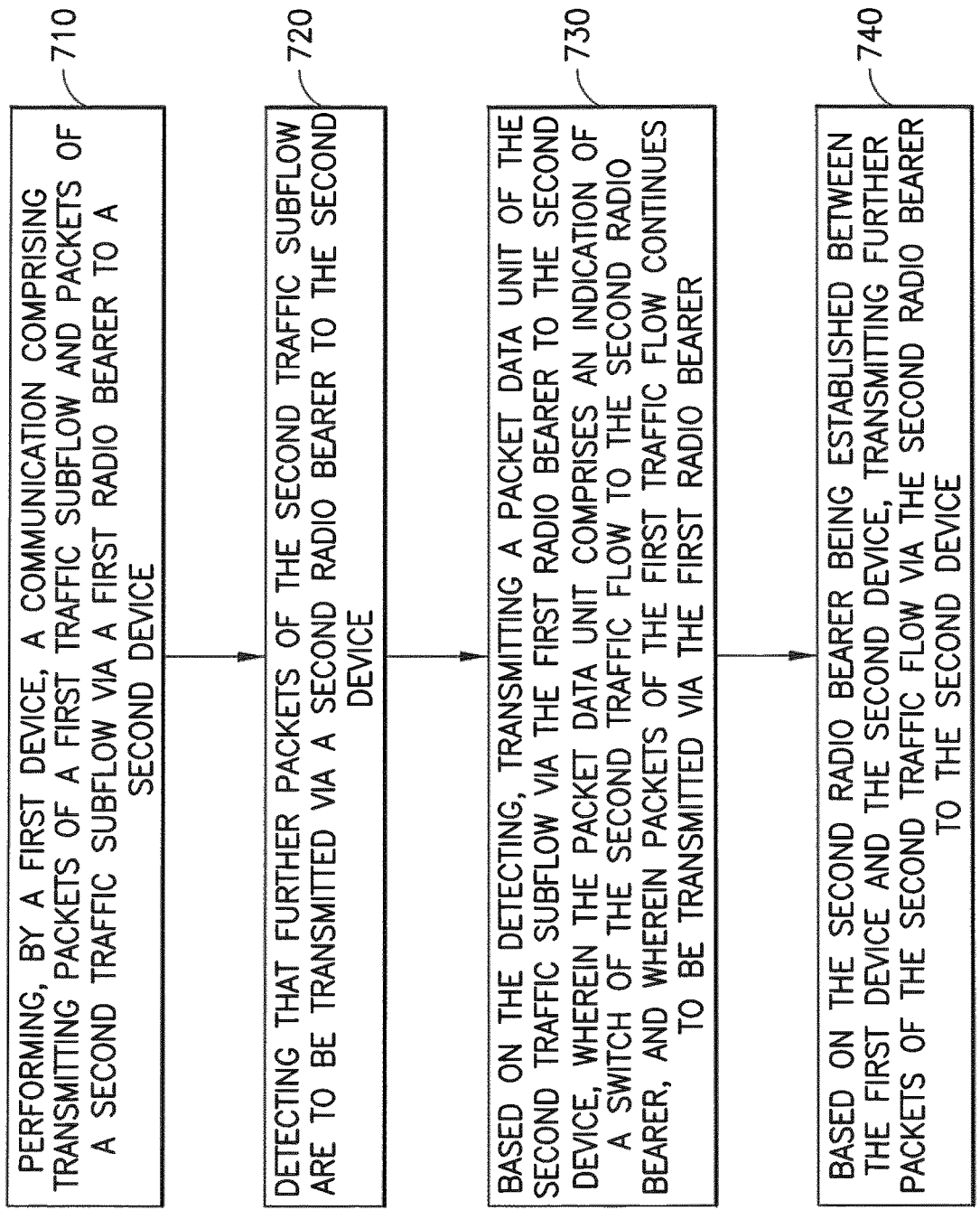
FIGS. 7a and 7b each show a block diagram illustrating a method in accordance with an example embodiment of the invention.

FIG. 7a illustrates operations which may be performed by a network device such as, but not limited to, a base station or an apparatus such as the apparatus 13 and/or NN 240 as in FIG. 2. As shown in step 710 there is performing, by a first device, a communication comprising transmitting packets of a first traffic subflow and packets of a second traffic subflow via a first radio bearer to a second device; then as shown in step 720 there is detecting that further packets of the second traffic subflow are to be transmitted via a second radio bearer to the second device; then as shown in step 730 of FIG. 7a there is, based on the detecting, transmitting a packet data unit of the second traffic subflow via the first radio bearer to the second device, wherein the packet data unit comprises an indication of a switch of the second traffic flow to the second radio bearer, and wherein packets of the first traffic flow continues to be transmitted via the first radio bearer; and as shown in step 740 there is, based on the second radio bearer being established between the first device and the second device, transmitting further packets of the second traffic flow via the second radio bearer to the second device.

In accordance with the example embodiments as described in the paragraph above, there is, based on the detecting, causing the second device to establish the second radio bearer.

In accordance with the example embodiments as described in the paragraphs above, the detecting comprises detecting that the further packets of the second traffic subflow are associated with an application that requires a higher priority.

In accordance with the example embodiments as described in the paragraphs above, there is receiving confirmation of reception of the packet data unit from the second device, wherein the confirmation of reception may be confirmation of in-order reception of the packet data unit, wherein the transmitting the further packets of the second traffic flow is based on the confirmation.

In accordance with the example embodiments as described in the paragraphs above, the packet data unit comprises a sequence number.

In accordance with the example embodiments as described in the paragraphs above, the sequence number causes in-sequence delivery of packets for the radio bearers at the second device.

In accordance with the example embodiments as described in the paragraphs above, the packet data unit causes the second device to deliver the packets belonging to the second traffic subflow to a higher layer of the second device.

In accordance with the example embodiments as described in the paragraphs above, the higher layer is an application layer.

In accordance with the example embodiments as described in the paragraphs above, prior to transmitting the second traffic flow towards the second radio bearer of the second device, the packets are buffered at the first device.

A non-transitory computer-readable medium (MEM 226 and/or MEM 246 as in FIG. 2) storing program code (PROG 228 and/or PROG 248 as in FIG. 2), the program code executed by at least one processor (DP 224 and/or DP 244 as in FIG. 2) to perform the operations as at least described in the paragraphs above.

In accordance with an example embodiment of the invention as described above there is an apparatus comprising: means for performing (DP 224, DP 225, and/or DP 244; PROG 228 and/or PROG 248; and MEM 226 and/or MEM 246 as in FIG. 2), by a first device, a communication comprising transmitting packets of a first traffic subflow and packets of a second traffic subflow via a first radio bearer to a second device; means for detecting (DP 224, DP 225, and/or DP 244; PROG 228 and/or PROG 248; and MEM 226 and/or MEM 246 as in FIG. 2) that further packets of the second traffic subflow are to be transmitted via a second radio bearer to the second device; means based on the detecting, for transmitting (DP 224, DP 225, and/or DP 244; PROG 228 and/or PROG 248; and MEM 226, MEM 246, and/or TRANS 222 as in FIG. 2) a packet data unit of the second traffic subflow via the first radio bearer to the second device, wherein the packet data unit comprises an indication of a switch of the second traffic flow to the second radio bearer, and wherein packets of the first traffic flow continues to be transmitted via the first radio bearer; and means based on the second radio bearer being established between the first device and the second device, for transmitting further packets of the second traffic flow via the second radio bearer to the second device.

Figure 7B:
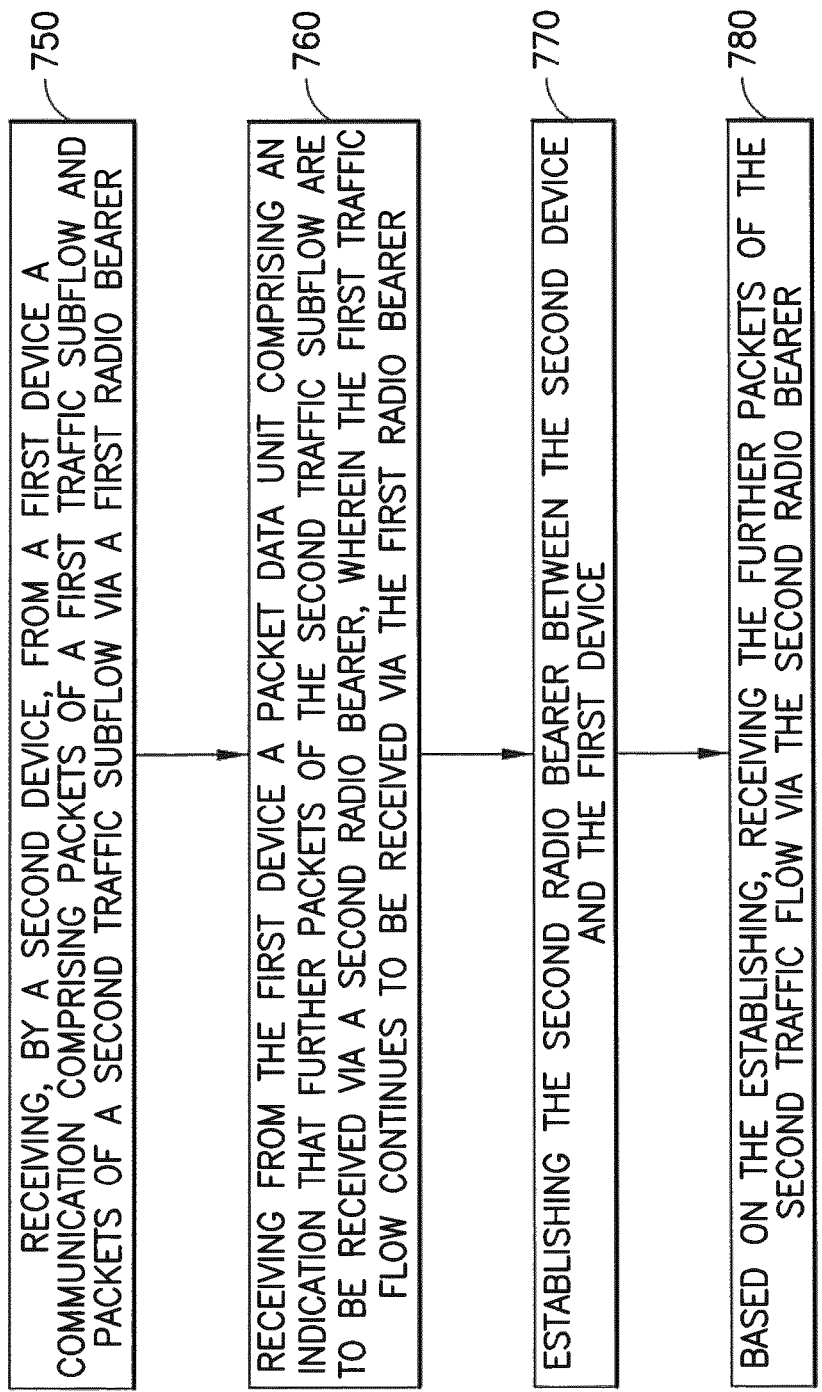

FIG. 7b illustrates operations which may be performed by a device such as, but not limited to, a communication device (e.g., the apparatus 10 as in FIG. 2). As shown in step 750 there is receiving, by a second device, from a first device a communication comprising packets of a first traffic subflow and packets of a second traffic subflow via a first radio bearer; as shown in step 760 of FIG. 7b there is receiving from the first device a packet data unit comprising an indication that further packets of the second traffic subflow are to be received via a second radio bearer, wherein the first traffic flow continues to be received via the first radio bearer; as shown in step 770 there is establishing the second radio bearer between the second device and the first device; and then as shown in step 780 of FIG. 7b there is, based on the establishing, receiving the further packets of the second traffic flow via the second radio bearer.

In accordance with the example embodiments as described in the paragraph above, there is receiving instructions to establish the second radio bearer.

In accordance with the example embodiments as described in the paragraphs above, there is sending confirmation of reception of the packet data unit to the first device, wherein the confirmation of reception may be confirmation of in-order reception of the packet data unit, wherein the further packets of the second traffic flow is received based on the confirmation.

In accordance with the example embodiments as described in the paragraphs above, the packet data unit comprises a sequence number.

In accordance with the example embodiments as described in the paragraphs above, the sequence number enables in-sequence delivery of packets for the radio bearers.

In accordance with the example embodiments as described in the paragraphs above, the packet data unit enables the second device to deliver the packets belonging to the second traffic subflow to a higher layer of the communication device.

In accordance with the example embodiments as described in the paragraphs above, the higher layer is an application layer.

In accordance with the example embodiments as described in the paragraphs above, prior to receiving the packet data unit the second traffic flow is buffered at the second device, and wherein delivering the packets belonging to the traffic subflow to the higher layer is performed only after receiving the packet data unit.

A non-transitory computer-readable medium (MEM 216 as in FIG. 2) storing program code (PROG 218 as in FIG. 2), the program code executed by at least one processor (DP 214 and/or DP 215 as in FIG. 2) to perform the operations as at least described in the paragraphs above.

In accordance with an example embodiment of the invention as described above there is an apparatus comprising: means for receiving (TRANS 212; DP 214 and/or DP 215; PROG 218; and MEM 216 as in FIG. 2), by a second device, from a first device a communication comprising packets of a first traffic subflow and packets of a second traffic subflow via a first radio bearer; means for receiving (TRANS 212; DP 214 and/or DP 215; PROG 218; and MEM 216 as in FIG. 2) from the first device a packet data unit comprising an indication that further packets of the second traffic subflow are to be received via a second radio bearer, wherein the first traffic flow continues to be received via the first radio bearer; means for establishing (TRANS 212; DP 214 and/or DP 215; PROG 218; and MEM 216 as in FIG. 2) the second radio bearer between the second device and the first device; and means for receiving (TRANS 212; DP 214 and/or DP 215; PROG 218; and MEM 216 as in FIG. 2) the further packets of the second traffic flow via the second radio bearer.

In accordance with the example embodiments there is an apparatus (e.g., a first device) performing a method comprising performing a communication comprising transmitting packets of a first traffic subflow and packets of a second traffic subflow via a first radio bearer to a second device; detecting that further packets of the second traffic subflow are to be transmitted via a second radio bearer to the second device; then, based on the detecting, transmitting a packet data unit via the first radio bearer to the second device, wherein the packet data unit comprises an indication of a switch of the second traffic flow to the second radio bearer, and wherein packets of the first traffic flow continues to be transmitted via the first radio bearer; and based on the second radio bearer being established between the first device and the second device, transmitting further packets of the second traffic flow via the second radio bearer to the second device.

In further example embodiments the apparatus performing a method comprising the method of the previous paragraph, there is: based on the detecting, causing the second device to establish the second radio bearer; receiving confirmation of reception of the packet data unit from the second device, wherein the confirmation of reception may be confirmation of in-order reception of the packet data unit, wherein the transmitting the second traffic flow is based on the confirmation; the packet data unit comprises a sequence number; the sequence number causes in-sequence delivery of packets for the radio bearers at the second device the packet data unit causes the second device to deliver the packets belonging to the second traffic subflow to a higher layer of the second device; the higher layer is an application layer; and prior to transmitting the second traffic flow towards the second radio bearer of the second device, the packets are buffered at the first device.

A non-transitory computer-readable medium (MEM 226 and/or MEM 246 as in FIG. 2) storing program code (PROG 228 and/or PROG 248 as in FIG. 2), the program code executed by at least one processor (DP 224 and/or DP 244 as in FIG. 2) to perform the operations as at least described in the paragraphs above.

In accordance with the example embodiments there is an apparatus (e.g., a second device) performing a method comprising receiving from a first device a communication comprising packets of a first traffic subflow and packets of a second traffic subflow via a first radio bearer; receiving from the first device a packet data unit comprising an indication that further packets of the second traffic subflow are to be received via a second radio bearer, wherein the first traffic flow continues to be received via the first radio bearer; establishing the second radio bearer between the second device and the first device; and then, based on the establishing, receiving the further packets of the second traffic flow via the second radio bearer.

In further example embodiments the apparatus performing a method comprising the method of the previous paragraph, there is: receiving instructions to establish the different radio bearer; sending confirmation of reception of the packet data unit to the first device, wherein the confirmation of reception may be confirmation of in-order reception of the packet data unit, wherein the second traffic flow is received based on the confirmation; the packet data unit comprises a sequence number; the sequence number enables in-sequence delivery of packets for the second radio bearer on a priority of the packets; the packet data unit enables the second device to deliver the packets belonging to the second traffic subflow to a higher layer of the communication device; the higher layer is an application layer; and prior to receiving the packet data unit the second traffic flow is buffered at the second device, wherein delivering the packets belonging to the traffic subflow to the higher layer is performed only after receiving the packet data unit.

A non-transitory computer-readable medium (MEM 216 as in FIG. 2) storing program code (PROG 218 as in FIG. 2), the program code executed by at least one processor (DP 214 and/or DP 215 as in FIG. 2) to perform the operations as at least described in the paragraphs above.

It is noted that any reference to a particular user equipment (UE) and/or base station (eNB) performing an operation in accordance with the example embodiments is non-limiting. Any of the operations in accordance with the example embodiments of the invention may be performed by any suitable device or apparatus, and these suitable device or apparatus does not need to be a UE or eNB as described.

In addition, any reference to operations in accordance with the embodiments of the invention being directed to use with a particular radio network technology, e.g., 5G, are not limiting. The example embodiments of the invention may be performed with any current, past, or future radio network technologies.

Further, in accordance with the example embodiments the operations as performed in a system of different devices, e.g., apparatus 13, NN 240, and apparatus 10.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   performing, by a first device, a communication comprising transmitting packets of a first traffic flow and packets of a second traffic flow via a first radio bearer to a second device;
   detecting, by the first device, that further packets of the second traffic flow are to be transmitted via a second radio bearer to the second device; and
   based on the detecting, transmitting, by the first device, a packet data unit via the first radio bearer to the second device, wherein the packet data unit comprises an indication of a switch of the second traffic flow to the second radio bearer, and wherein packets of the first traffic flow continue to be transmitted via the first radio bearer.

2. The method of claim 1, comprising:
   based on the second radio bearer being established between the first device and the second device, transmitting, by the first device, the further packets of the second traffic flow via the second radio bearer to the second device.

3. The method of claim 1, wherein the detecting comprises detecting that the further packets of the second traffic flow are associated with an application that requires a higher priority.

4. The method of claim 1, comprising:
receiving confirmation of reception of the packet data unit from the second device, wherein the confirmation of reception may be confirmation of in-order reception of the packet data unit, wherein the transmitting the further packets of the second traffic flow is based on the confirmation.

5. The method of claim 1, wherein the packet data unit comprises a sequence number.

6. The method of claim 5, wherein the sequence number causes in-sequence delivery of packets for the radio bearers at the second device.

7. The method of claim 1, wherein the packet data unit causes the second device to deliver the packets belonging to the second traffic flow to a higher layer of the second device.

8. An apparatus comprising:
at least one processor; and
at least one memory including computer program code, where the at least one memory and the computer program code are configured, with the at least one processor, to cause the apparatus to at least:
perform a communication comprising transmitting packets of a first traffic flow and packets of a second traffic flow via a first radio bearer from a first device to a second device;
detect that further packets of the second traffic flow are to be transmitted via a second radio bearer to the second device; and
based on the detecting, transmit a packet data unit via the first radio bearer from the first device to the second device, wherein the packet data unit comprises an indication of a switch of the second traffic flow to the second radio bearer, and wherein packets of the first traffic flow continues to be transmitted via the first radio bearer.

9. The apparatus of claim 8, wherein the at least one memory including the computer program code is configured with the at least one processor to cause the apparatus to:
based on the second radio bearer being established between the first device and the second device, transmit the further packets of the second traffic flow via the second radio bearer from the first device to the second device.

10. The apparatus of claim 8, wherein the detecting comprises detecting that the further packets of the second traffic flow are associated with an application that requires a higher priority.

11. The apparatus of claim 8, wherein the at least one memory including the computer program code is configured with the at least one processor to cause the apparatus to:
receive confirmation of reception of the packet data unit from the second device, wherein the confirmation of reception may be confirmation of in-order reception of the packet data unit, wherein the transmitting the further packets of the second traffic flow is based on the confirmation.

12. The apparatus of claim 8, wherein the packet data unit comprises a sequence number.

13. The apparatus of claim 12, wherein the sequence number causes in-sequence delivery of packets for the radio bearers at the second device.

14. The apparatus of claim 8, wherein the packet data unit causes the second device to deliver the packets belonging to the second traffic flow to a higher layer of the second device.

15. An apparatus comprising:
at least one processor; and
at least one memory including computer program code, where the at least one memory and the computer program code are configured, with the at least one processor, to cause the apparatus to at least:
receive from a first device a communication comprising packets of a first traffic flow and packets of a second traffic flow via a first radio bearer;
receive from the first device a packet data unit comprising an indication that further packets of the second traffic flow are to be received via a second radio bearer, wherein the first traffic flow continues to be received via the first radio bearer;
establish the second radio bearer between the apparatus and the first device; and
based on the establishing, receive the further packets of the second traffic flow via the second radio bearer.

16. The apparatus of claim 15, wherein the at least one memory including the computer program code is configured with the at least one processor to cause the apparatus to:
receive instructions to establish the second radio bearer.

17. The apparatus of claim 16, wherein the at least one memory including the computer program code is configured with the at least one processor to cause the apparatus to:
send confirmation of reception of the packet data unit to the first device, wherein the confirmation of reception may be confirmation of in-order reception of the packet data unit, wherein the further packets of the second traffic flow are received based on the confirmation.

18. The apparatus of claim 15, wherein the packet data unit comprises a sequence number.

19. The apparatus of claim 18, wherein the sequence number enables in-sequence delivery of packets for the radio bearers.

20. The apparatus of claim 15, wherein the at least one memory including the computer program code is configured with the at least one processor to cause the apparatus to:
deliver the packets belonging to the second traffic flow to a higher layer only after receiving the packet data unit.

21. A non-transitory computer readable medium comprising program instructions for causing a first device to perform at least the following:
performing a communication comprising transmitting packets of a first traffic flow and packets of a second traffic flow via a first radio bearer to a second device;
detecting that further packets of the second traffic flow are to be transmitted via a second radio bearer to the second device; and
based on the detecting, transmitting a packet data unit via the first radio bearer to the second device, wherein the packet data unit comprises an indication of a switch of the second traffic flow to the second radio bearer, and wherein packets of the first traffic flow continue to be transmitted via the first radio bearer.

22. The non-transitory computer readable medium of claim 21, wherein the program instructions further cause the first device to perform:
based on the second radio bearer being established between the first device and the second device, transmitting the further packets of the second traffic flow via the second radio bearer to the second device.

23. The non-transitory computer readable medium of claim 21, wherein the detecting comprises detecting that the further packets of the second traffic flow are associated with an application that requires a higher priority.

24. The non-transitory computer readable medium of claim 21, wherein the program instructions further cause the first device to perform:

receiving confirmation of reception of the packet data unit from the second device, wherein the confirmation of reception may be confirmation of in-order reception of the packet data unit, and wherein the transmitting the further packets of the second traffic flow is based on the confirmation.

25. The non-transitory computer readable medium of claim 21, wherein the packet data unit causes the second device to deliver the packets belonging to the second traffic flow to a higher layer of the second device.

* * * * *